United States Patent [19]
Kasano

[11] Patent Number: 5,315,694
[45] Date of Patent: May 24, 1994

[54] HIGH-SPEED COLOR SATURATION CONVERTER FOR DIGITAL COLOR DATA

[75] Inventor: Akira Kasano, Kokubunji, Japan

[73] Assignee: Kabushiki Kaisha Toshiba, Kawasaki, Japan

[21] Appl. No.: 398,948

[22] Filed: Aug. 28, 1989

[30] Foreign Application Priority Data

Aug. 31, 1988 [JP] Japan ................... 63-216830

[51] Int. Cl.$^5$ ............................ G06F 15/00
[52] U.S. Cl. ............................ 395/131
[58] Field of Search ......... 364/518, 521, 526; 358/75, 80, 504, 506, 516, 518; 395/131

[56] References Cited

U.S. PATENT DOCUMENTS

| | | | |
|---|---|---|---|
| 4,814,891 | 3/1989 | Uchiyama et al. | 358/80 X |
| 4,843,573 | 6/1989 | Taylor et al. | 364/521 |
| 4,847,654 | 7/1989 | Honma et al. | 358/75 X |
| 4,887,150 | 12/1989 | Chiba et al. | 358/80 |
| 4,920,411 | 4/1990 | Miyakawa | 358/80 |
| 4,922,335 | 5/1990 | Outa et al. | 358/80 |
| 4,945,406 | 7/1990 | Cok | 358/80 |
| 4,954,889 | 9/1990 | Endo et al. | 358/80 |
| 4,965,663 | 10/1990 | Sasaki | 358/80 |
| 4,967,379 | 10/1990 | Ott | 364/526 |
| 5,042,078 | 8/1991 | Oshikoshi et al. | 358/80 X |

*Primary Examiner*—Mark K. Zimmerman
*Attorney, Agent, or Firm*—Finnegan, Henderson Farabow, Garrett & Dunner

[57] ABSTRACT

A high-speed saturation converter for a color image, comprising first R, G, and B image memories for storing digital color image data separated into R, G, and B, matrix coefficient calculating CPU for calculating two types of matrix coefficients $\alpha$ and $\beta$ defined by the following equation based on given saturation conversion coefficient a:

$$\alpha = 1 + 2a, \beta = 1 - a;$$

a processor for calculating R, G, and B components r*, g*, and b* of an identical pixel when saturation conversion S* = aS is performed with respect to vector S, in an RGB color space, of saturation components corresponding to R, G, and B components of the identical pixel in the first R, G, and B image memories, in accordance with the following matrix equation defined when an intensity before and after the conversion is constant:

$$\begin{pmatrix} r^* \\ g^* \\ b^* \end{pmatrix} = (1/3) \begin{pmatrix} \alpha & \beta & \beta \\ \beta & \alpha & \beta \\ \beta & \beta & \alpha \end{pmatrix} \begin{pmatrix} r \\ g \\ b \end{pmatrix};$$

and second R, G, and B image memories for storing the R, G, and B components r*, g*, and b* calculated by the processor means in a position of the corresponding pixel.

11 Claims, 6 Drawing Sheets

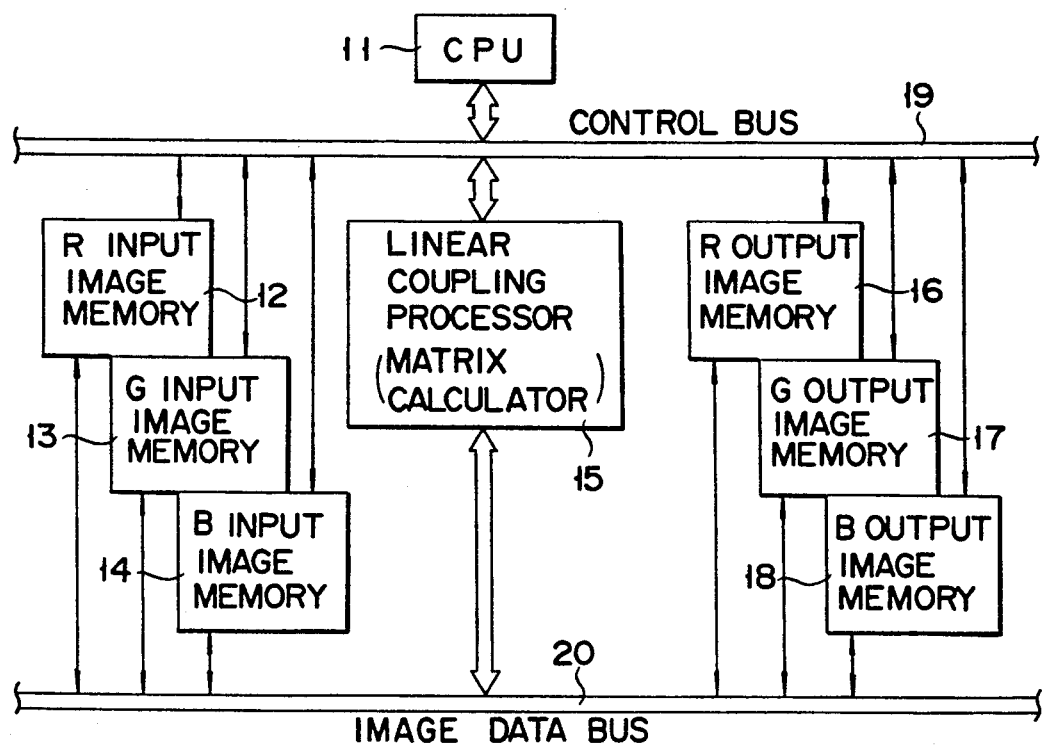
F I G. 1A
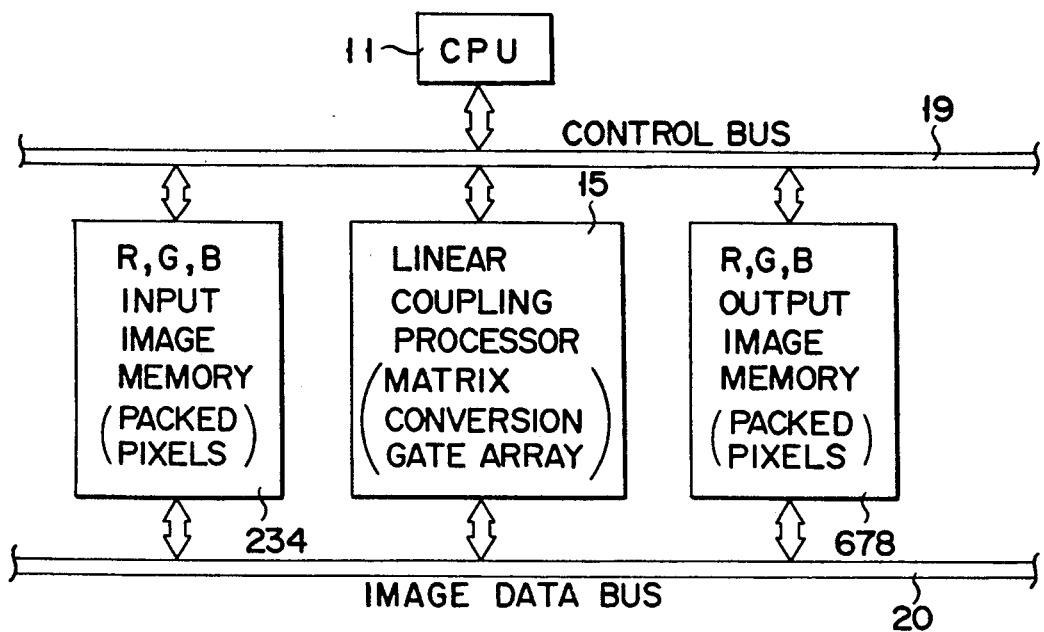
F I G. 1B

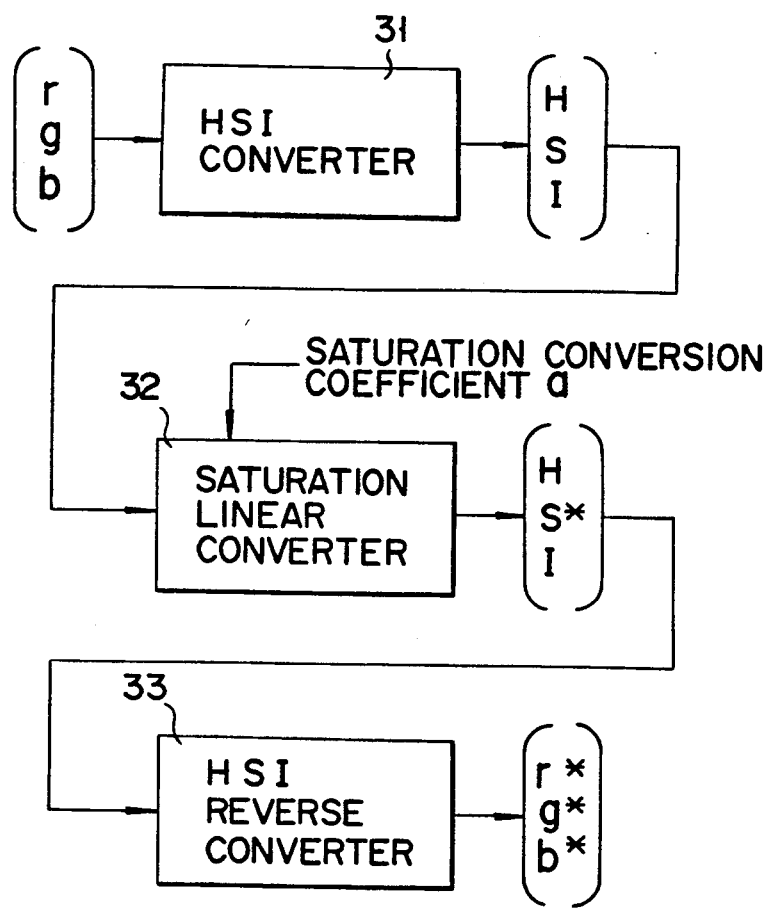
F I G. 3

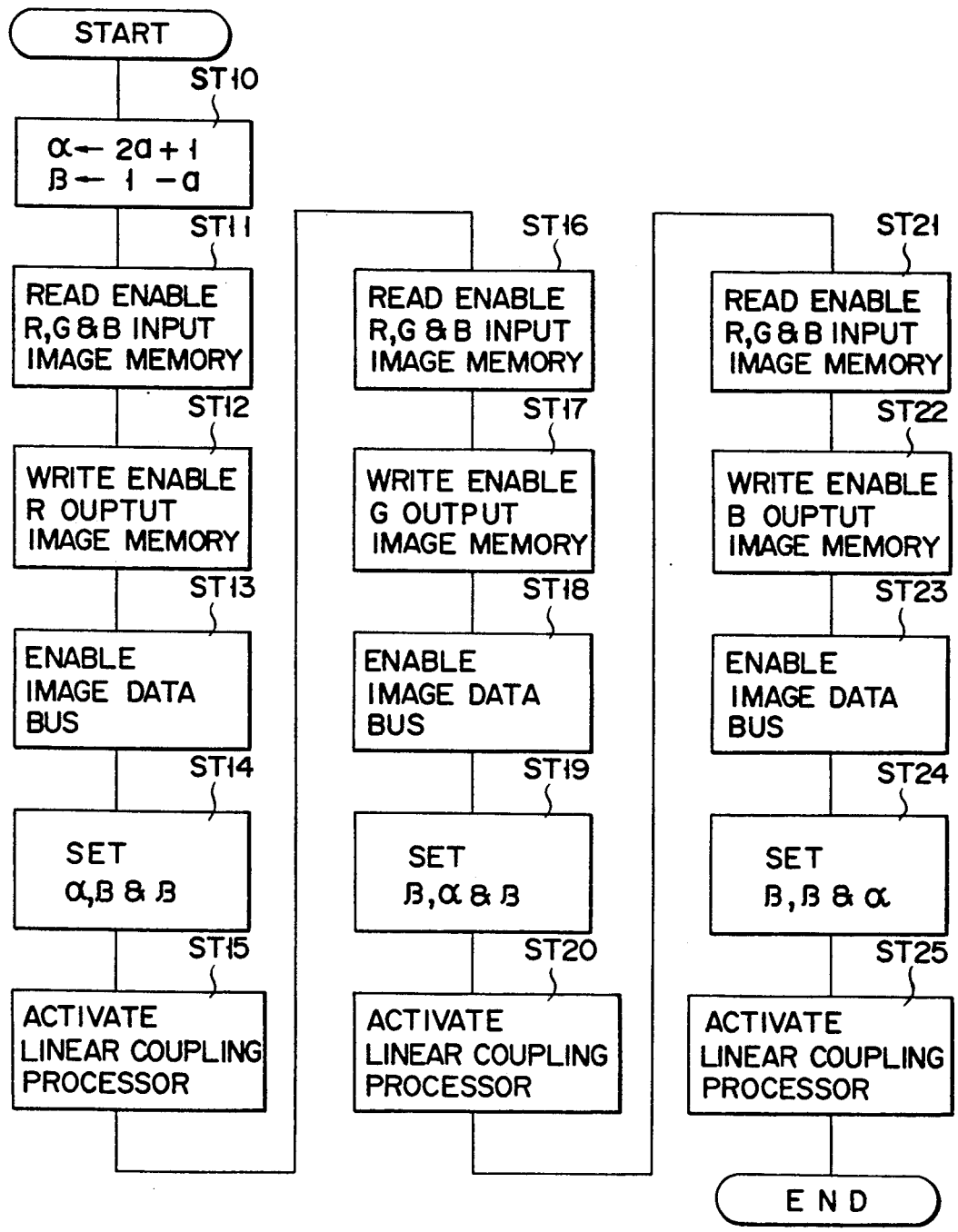
F I G. 5

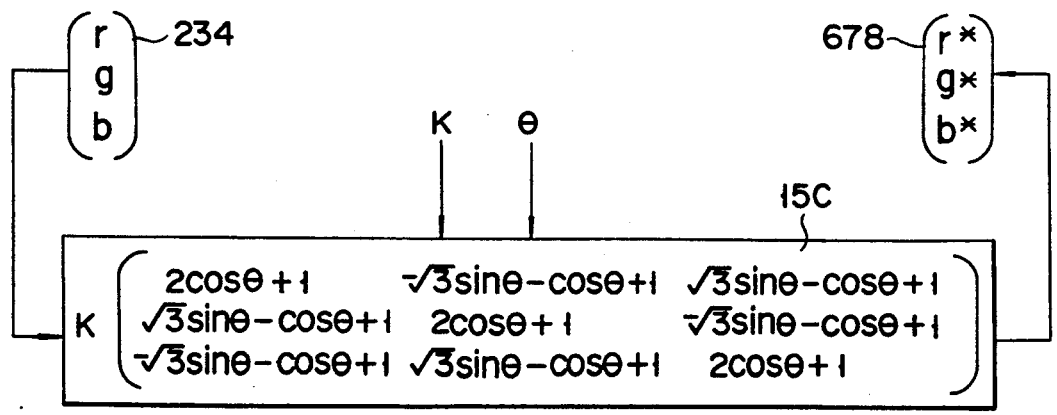
F I G. 7
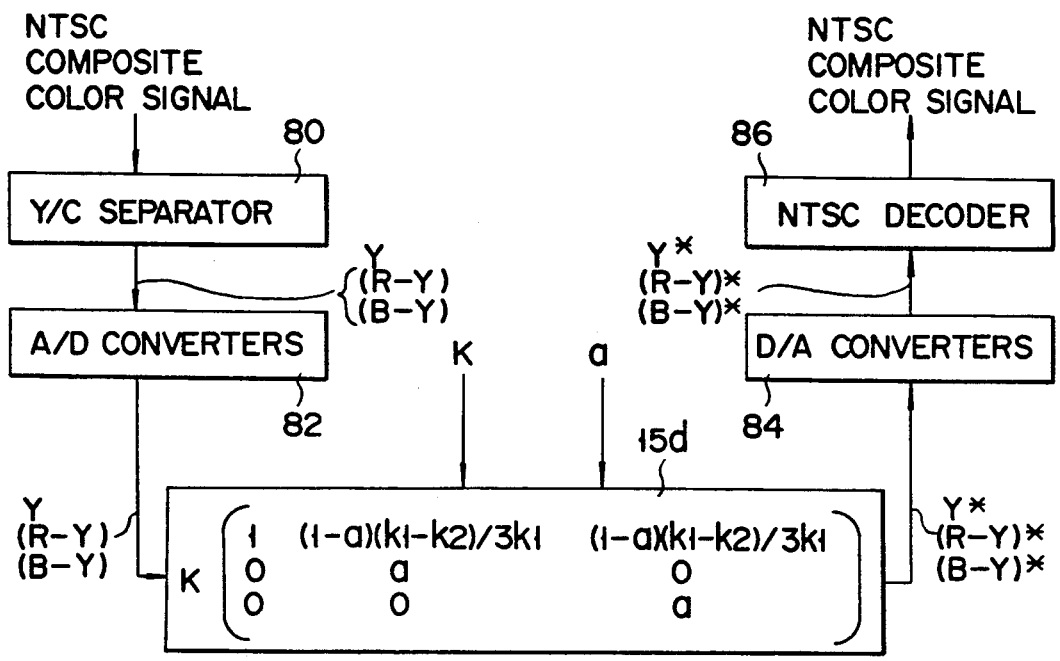
$Y = k_1G + k_2R + k_3B$  ($k_1 = 0.59$, $k_2 = 0.30$, $k_3 = 0.11$)
F I G. 8

HIGH-SPEED COLOR SATURATION CONVERTER FOR DIGITAL COLOR DATA

Background of the Invention

1. Field of the Invention

The present invention relates to a high-speed color saturation converter for a color image suitable for high-speed conversion of saturation (vividness or brilliance of a color) of digital color image data separated into R (red), G (green), and B (blue) components stored in image memories.

2. Description of the Related Art

In general, saturation conversion of R, G, and B color images is performed by so-called HSI conversion (H:hue, S:saturation, and I:intensity). In HSI conversion, saturation component S is extracted and linearly converted. Thereafter, HSI reverse conversion is performed. When the R, G, and B color components are quantized into 8 bits, saturation component S obtained by the HSI conversion is defined as follows:

$$S = \frac{255}{r + g + b} \times \{\min(g + b - 2r, r + b - 2g, r + g - 2b)\} \quad (1)$$

where r, g, and b are R, G, B components of color data, respectively. Linear conversion of saturation S→S* is performed in accordance with the following equation:

$$S^* = aS \quad (2)$$

where a is a saturation conversion coefficient. In addition, the HSI reverse conversion is not uniformly determined because of non-linearity of the HSI conversion. In order to increase a speed of the above-mentioned three-stage conversion (the equations (1) and (2), and the HSI reverse conversion), as shown in, e.g., FIG. 3, exclusive hardware converters, i.e., HSI converter 31, saturation linear converter 32, and HSI reverse converter 33 are required.

As described above, when the different three-stage conversion processes are employed for saturation conversion for a color image, exclusive hardware converters are required in order to increase a speed of conversion processing. If these circuits are formed as LSIs, a semiconductor chip area is increased, resulting in a high cost. In the HSI reverse conversion, an error due to approximation caused by the non-linearity of the conversion is undesirably large.

SUMMARY OF THE INVENTION

It is, therefore, an object of the present invention to realize high-speed saturation conversion of a color image, without quantization error, using a small-scale system arrangement.

According to the present invention, linear saturation conversion can be achieved by simplifying the saturation conversion to only vector arithmetic operation in an RGB color vector space. More specifically, vector $\bar{S}$, in an RGB color space, of saturation components corresponding to R, G, and B components r, g, and b of an identical pixel is defined as follows:

$$S = \frac{85}{r + g + b} \begin{pmatrix} 2r - g - b \\ -r + 2g - b \\ -r - g + 2b \end{pmatrix} \quad (3)$$

$$= \frac{85}{r + g + b} \begin{pmatrix} 2 & -1 & -1 \\ -1 & 2 & -1 \\ -1 & -1 & 2 \end{pmatrix} \begin{pmatrix} r \\ g \\ b \end{pmatrix}$$

when the maximum value of components r, g, and b is 255 (8-bit quantization). Under the condition that the intensity before and after conversion is constant, R, G, and B components r*, b*, and b* of the pixel, when saturation conversion (S*=aS, where a is the saturation conversion coefficient) is performed with respect to vector S, are defined as the following equation:

$$\begin{pmatrix} r^* \\ g^* \\ b^* \end{pmatrix} = (1/3) \begin{pmatrix} \alpha & \beta & \beta \\ \beta & \alpha & \beta \\ \beta & \beta & \alpha \end{pmatrix} \begin{pmatrix} r \\ g \\ b \end{pmatrix} \quad (4)$$

for $\alpha = 1 + 2a$ and $\beta = 1 - a$. The equation (4) indicates that saturation conversion can be performed by a simple linear coupling arithmetic operation among the R, G, and B image memories (R, G, and B components in an identical pixel) when saturation conversion coefficient is determined.

In the present invention, the above-mentioned two types of matrix coefficients $\alpha$ and $\beta$ are previously obtained based on given saturation conversion coefficient a in accordance with the relationship between equations ($\alpha = 1 + 2a$) and ($\beta = 1 - a$). The linear coupling arithmetic operation is performed in accordance with the equation (4) using coefficients $\alpha$ and $\beta$, and R, G, and B components r, g, and b of an identical pixel in the R, G, and B image memories. Therefore, R, G, and B components r*, g*, and b* of the pixel when saturation conversion ($\bar{S}^* = a\bar{S}$) is performed are obtained.

With the above arrangement, the two types of coefficients $\alpha$ and $\beta$ may be obtained by a simple arithmetic operation of addition and subtraction. Thereafter, R, G, and B components r*, g*, and b* of the pixel when saturation conversion ($\bar{S}^* = a\bar{S}$) is performed with respect to vector $\bar{S}$ in the RGB color space can be simply obtained by only performing a linear coupling arithmetic operation (matrix calculation) using a linear coupling processor (gate array).

BRIEF DESCRIPTION OF THE DRAWINGS

FIG. 1A is a block diagram showing a digital color saturation converter according to an embodiment of the present invention;

FIG. 1B is a block diagram showing a modification of the embodiment of FIG. 1A;

FIG. 3 shows an HSI type digital color saturation converter to which the present invention is not applied;

FIG. 5 is a flow chart explaining an operation of the color saturation converter shown in FIG. 1A, 1B, or 4;

FIG. 7 illustrates a basic configuration of a digital RGB color hue/intensity converter of the present invention; and FIG. 8 illustrates a basic configuration of a digital (Y, R-Y, and B-Y) color saturation/intensity converter of the present invention.

DETAILED DESCRIPTION OF THE PREFERRED EMBODIMENTS

Figure 2:
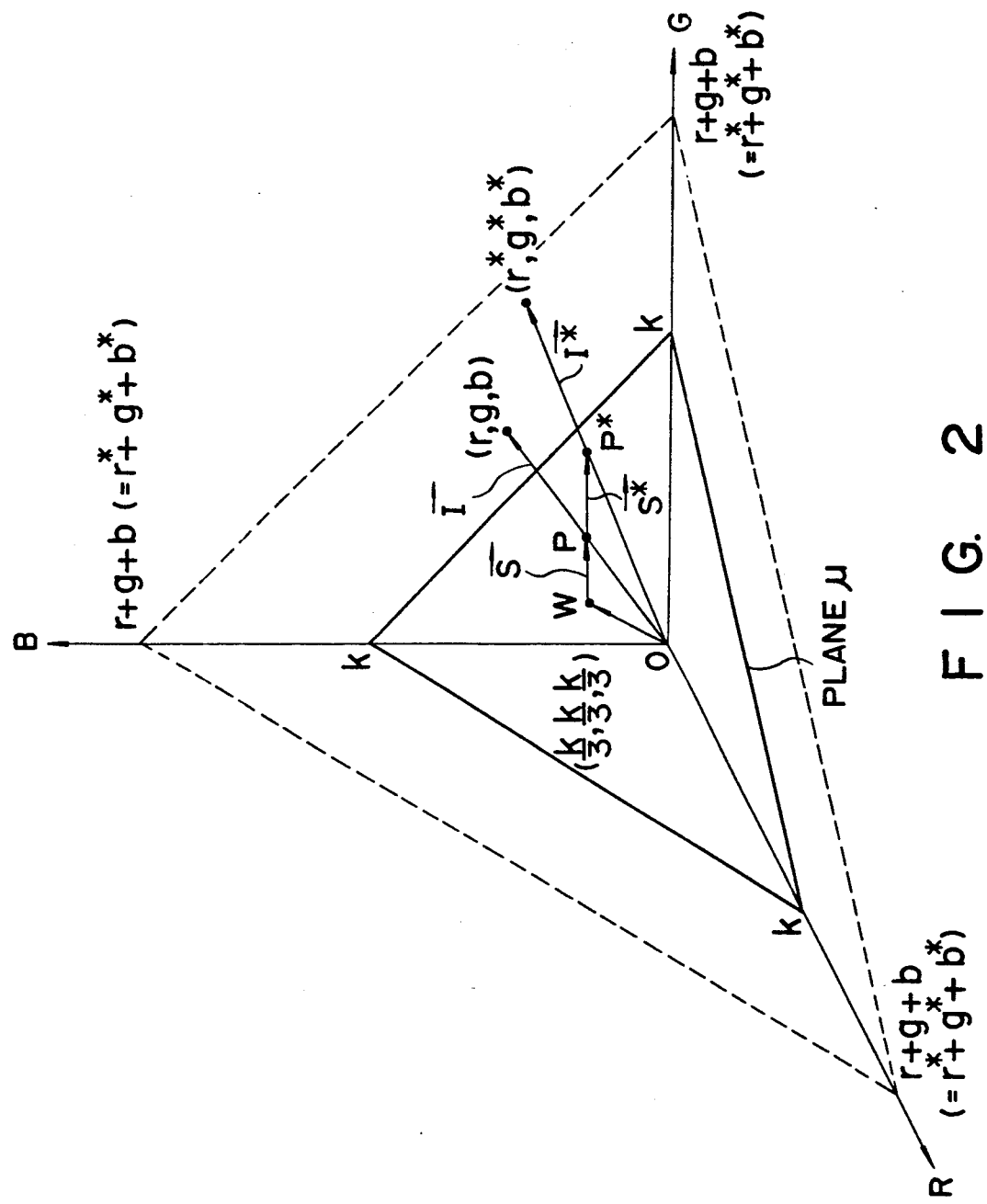
FIG. 2 shows a 3-dimensional RGB color vector space illustrating a color saturation conversion of the present invention.

FIG. 1A is a block diagram showing an arrangement of a high-speed saturation converter of a color image according to an embodiment of the present invention. Referring to FIG. 1A, reference numeral 11 denotes a CPU for controlling the entire converter. Reference numerals 12, 13 and 14 denote input image memories (R, G, and B input image memories) for storing digital R, G, and B image data input by, eg., a color camera, and respectively separated into R, G, and B components, in correspondence with each pixel position. Reference numeral 15 denotes a linear coupling processor used to perform a 3×3 matrix arithmetic operation in saturation conversion for each pixel. Matrix calculation using processor 15 is performed by a hardware arithmetic operation using a gate array or a software arithmetic operation using a high-speed MPU. Regardless of the type of the operation (hardware or software), a known algorithm of the matrix calculation itself can be utilized. Reference numerals 16, 17, and 18, respectively, denote output image memories (R, G, and B output image memories) for storing a calculation result for each pixel and each of the R, G, and B components obtained by linear coupling processor 15.

Reference numeral 19 denotes a system control bus (to be referred to as a control bus hereinafter) used to cause CPU 11 to control input image memories 12 to 14, linear coupling processor 15, and output image memories 16 to 18. Reference numeral 20 denotes an image data bus used to allow, e.g., transfer of image data between input image memories 12 to 14 and linear coupling processor 15, and between linear coupling processor 15 and, output image memories 16 to 18. Image data bus 20 includes a plurality of buses to transfer a plurality of types of the image data at the same time.

Although reference numerals 12 to 14 denote the input image memories and reference numeral 16 to 18 denote the output image memories in FIG. 1A, for the sake of convenience, these image memories can be switched and selectively used for both input and output, if necessary.

FIG. 1B shows a modification of the embodiment of FIG. 1A. In FIG. 1A, three exclusive memories are assigned to the R, G, and B components, respectively. Each memory is constituted by, e.g., an 8-bit plane. On the contrary, in FIG. 1B, a packed pixel system is employed. In the packed pixel system, 8-bit R, G, and B data are packed to be successive 24 bit ($=24\times3$) data. The 24-bit RGB data is stored in RGB input image memory 234 and RGB output image memory 678.

By exemplifying saturation (S) conversion of a color image having R, G, and B components r, g, and b, a principle of a saturation conversion system applied to the converter in FIG. 1A will be described below with reference to FIG. 2.

Color vector $\vec{I}$ of a color image having R, G, and B components r, g, and b is defined as follows:

$$\vec{I} = (r, g, b) \tag{5}$$

Plane $\mu$ having constant color intensity k is defined as:

$$R + G + B = k \tag{6}$$

The coordinates of intersecting point P between plane $\mu$ defined by the equation (6) and color vector $\vec{I}$ defined by the equation (5) are defined as follows:

$$P\left(\frac{Kr}{r+g+b}, \frac{Kg}{r+g+b}, \frac{kb}{r+g+b}\right) \tag{7}$$

because if $\vec{OP} = t\vec{I}$, then $t(r+g+b) = k$. The coordinates of central point W of plane $\mu$ are defined as:

$$W(k/3, k/3, k/3) \tag{8}$$

Vector $\vec{S}$ of saturation S in the RGB color space serves as a projection vector to a chromaticity plane (plane having a constant intensity) of a chromaticity vector (having only a direction when intensity is constant) including hue and saturation data. Therefore, if vector $\vec{OP}$ is a chromaticity vector, vector $\vec{S}$ is defined as:

$$\vec{S} = \vec{OP} = \vec{OW} \tag{9}$$

Since the coordinates of point (origin) O are defined as (O, O, O), vectors $\vec{OP}$ and $\vec{OW}$ are defined as follows using the coordinates of points P and W in the equations (7) and (8):

$$\vec{OP} = (1/3) \frac{k}{r+g+b} \begin{pmatrix} 3r \\ 3g \\ 3b \end{pmatrix}$$

$$\vec{OW} = (1/3) \frac{k}{r+g+b} \begin{pmatrix} r+g+b \\ r+g+b \\ r+g+b \end{pmatrix}$$

Therefore, the above equation (9) is defined as:

$$\vec{S} = (1/3) \frac{k}{r+g+b} \begin{pmatrix} 2r-g-b \\ -r+2g-b \\ -r-g+2b \end{pmatrix} \tag{10}$$

$$= (1/3) \frac{k}{r+g+b} \begin{pmatrix} 2 & -1 & -1 \\ -1 & 2 & -1 \\ -1 & -1 & 2 \end{pmatrix} \begin{pmatrix} r \\ g \\ b \end{pmatrix}$$

The equation (3) is obtained when $k=255$ in the equation (10).

Vector $\vec{S^*}$ when saturation conversion ($\vec{S^*} = a\vec{S}$) is performed with respect to vector S defined as the equation (10) using saturation conversion coefficient a is defined as:

$$\vec{S^*} = \vec{OP^*} - \vec{OW^*}$$

where $\vec{P^*}$ is the terminal end of vector $\vec{S^*}$ corresponding to distal end P of vector S). Therefore, since $\vec{S^*}=a\vec{S}$, vector OP* is defined as:

$$\vec{OP^*} = \vec{OW^*} + \vec{aS} \quad (11)$$

$$= (1/3)\frac{k}{r+g+b}\begin{pmatrix}\alpha & \beta & \beta \\ \beta & \alpha & \beta \\ \beta & \beta & \alpha\end{pmatrix}\begin{pmatrix}r \\ g \\ b\end{pmatrix}$$

for $\alpha=1+2a$ and $\beta=1-a$. As may be inferred from the equation (7), vector $\vec{OP^*}$ is defined as follows:

$$\vec{OP^*} = \frac{k}{r^*+g^*+b^*}\begin{pmatrix}r^* \\ g^* \\ b^*\end{pmatrix} \quad (12)$$

where r*, g*, and b* are the R, G, and B components of color vector $\vec{I^*}$ corresponding to color vector $\vec{I}$ after the above-mentioned saturation conversion. The above matrix equation (4) is obtained in accordance with the equations (12) and (11), and the conditions that the intensities of color vectors $\vec{I}$ and $\vec{I^*}$ are constant before and after the saturation conversion (i.e., $r+g+b=r^*+g^*+b^*$). As has been described above, the equation (4) represents that the saturation conversion can be performed by a simple linear coupling arithmetic operation among the R, G, and B image memories (in this case, among input image memories 12 to 14) when saturation conversion coefficient a is determined.

An operation of matrix 15a in the converter in FIG. 1A to which the above-mentioned saturation conversion principle is applied will be described hereinafter with reference to FIGS. 4 and 5.

(1) CPU 11 (11a) calculates a (3×3) matrix coefficient represented in the equation (4) based on given saturation conversion coefficient a (ST 10). However, since the nine matrix coefficients are divided into two types, i.e., $\alpha(=1+2a)$ and $\beta(=1-a)$, only two types of matrix coefficients $\alpha$ and $\beta$ need be calculated, in practice.

(2) CPU 11 accesses R, G, and B input image memories 12, 13, and 14 through control bus 19 (read enable; ST11), write enables R output image memory 16 ST12), and enables image data bus 20 (ST13).

(3) CPU 11 sets matrix coefficients $\alpha$ and $\beta$ calculated in item (1) in linear coupling processor 15 through control bus 19, in the form of $\alpha$, $\beta$, and $\beta$ (ST14), and activates linear coupling processor 15 and image memories 12 to 14, and 16 (ST15 and ST16).

(4) Input image memories 12 to 14 are sequentially read-accessed in units of pixels in response to access from CPU 11, and upon each access, the corresponding R, G, and B image data r, g, and b are transferred to linear coupling processor 15 through the designated bus in image data bus 20.

Linear coupling processor 15 performs the following linear coupling arithmetic operation (the equation (4); ST15) in order to obtain data r* using transferred image data r, g, and b, and matrix coefficients $\alpha$, $\beta$, and $\beta$ set in item (3):

$$(\tfrac{1}{3})(\alpha r+\beta g+\beta b) \quad (13)$$

Result r* of this arithmetic operation is transferred to R output image memory 16 through another bus in image data bus 20, and written in the position of the identical pixel in memory 16.

(5) When the above operation in item (4) is performed for all the pixels in input image memories 12 to 14, CPU 11 accesses R, G, and B input image memories 12, 13, and 14 (read enable; ST16) in the same manner as in item (2), write enables G output image ,memory 17 at this time (ST17), and enables image data bus 20 (ST18).

(6) CPU 11 sets the matrix coefficients in linear coupling processor 15 in the form of $\beta$, $\alpha$, and $\beta$ (ST19), and activates linear coupling processor 15 and image memories 12 to 14, and 17.

(7) Linear coupling processor 15 performs the following linear coupling arithmetic operation (the equation (4); ST20) to obtain data g* using the image data r, g, and b read and transferred from input image memories 12 to 14, and matrix coefficients $\beta$, $\alpha$, and $\beta$ set in item (6):

$$(\tfrac{1}{3})(\beta r+\alpha g+\beta b) \quad (14)$$

Result g* of this arithmetic operation is transferred to and written in G output image memory 17.

(8) When the above operation in item (7) is performed for all the pixels in input image memories 12 to 14, CPU 11 accesses R, G, and B input image memories 12, 13, and 14 (read enable; ST21) in the same manner as in item (2), write enables B output image memory 18 at this time (ST22), and enables image data bus 20 (ST23).

(9) CPU 11 sets the matrix coefficients in linear coupling processor 15 in the form of $\beta$, $\beta$, and $\alpha$ (ST24), and activates linear coupling processor 15 and image memories 12 to 14, and 18.

(10) Linear coupling processor 15 performs the following linear coupling arithmetic operation (the equation (4); ST25) to obtain data b* using image data r, g, and b read and transferred from input image memories 12 to 14, and matrix coefficients $\beta$, $\beta$, and $\alpha$ set in item (9):

$$(\tfrac{1}{3})(\beta r+\beta g+\alpha b) \quad (15)$$

Result b* of this arithmetic operation is transferred to and written in B output image memory 18.

Note that when display monitor refresh memories (monitor refresh memories) are used as output image memories 16 to 18 in FIG. 1A, this invention can be applied to a display operation (in particular, dynamic image display) in real time (video rate; 30 frames/sec.)

Figure 4:
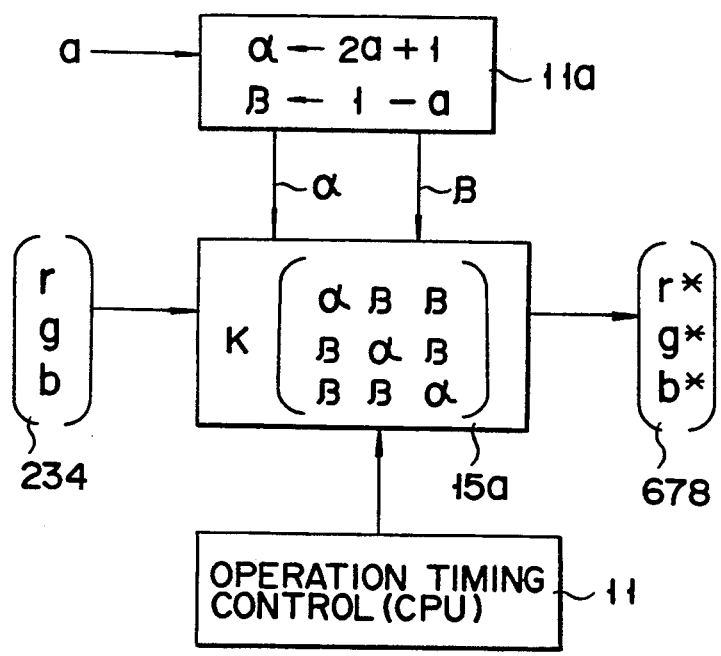
FIG. 4 illustrates a basic configuration of a digital RGB color saturation converter of the present invention.

Note that the coefficient $\tfrac{1}{3}$ in the equations (13), (14), and (15) corresponds to coefficient K in matrix 15a in FIG. 4. By utilizing $K=\tfrac{1}{3}$, only the saturation can be digitally controlled by parameter a without changing the intensity.

Figure 6:
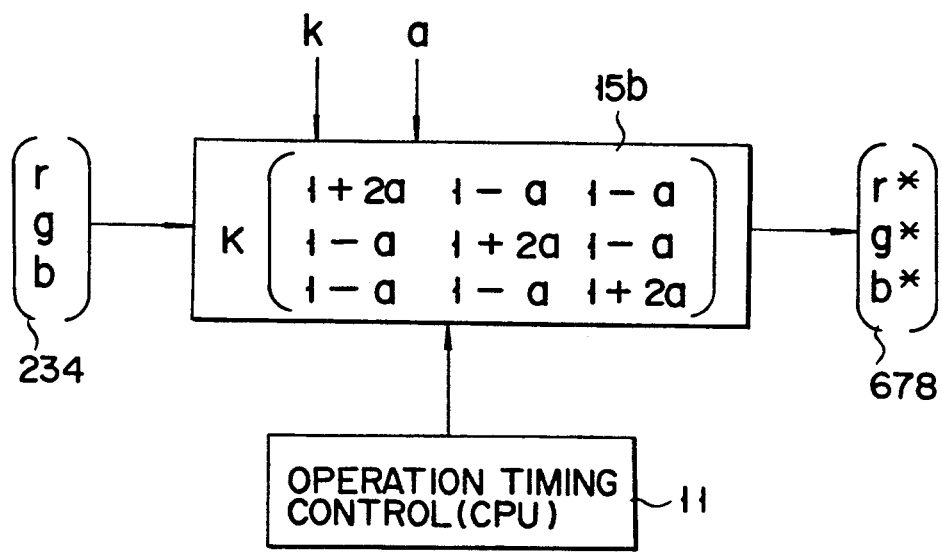
FIG. 6 is a modification of the color saturation converter shown in FIG. 4.

FIG. 6 shows a modification of the converter in FIG. 4. In FIG. 4, after two matrix coefficients $\alpha$ and $\beta$ are temporarily calculated based on saturation conversion coefficient a, data r, g, and b are subjected to matrix conversion into data r*, g*, and b*. On the contrary, in FIG. 6, saturation conversion coefficient a is directly used to set matrix coefficients (1+2a, and 1−a), and the coefficient conversion processing by CPU 11a in FIG. 4 is omitted.

Note that coefficient K of conversion matrix 15b is used as a variable parameter in FIG. 6. Therefore, when saturation conversion coefficient a is fixed and parameter K is changed, only the intensity can be changed while the saturation is kept constant. When parameter K is fixed and saturation conversion coefficient a is changed, only the saturation can be changed while the intensity is kept constant. When both saturation conversion coefficient a and parameter K are changed, the intensity can be changed together with the saturation.

FIG. 7 shows a case wherein the matrix in FIG. 4 is rotary matrix 15c. Phase angles of r, g, and b color vector data which have passed through the matrix in FIG. 7 are rotated by an amount corresponding to parameter $\theta$. This vector rotation allows a change in hue of the color data.

When the phase angle parameter $\theta$ is fixed and intensity parameter K is changed, only the intensity can be changed while the hue is kept constant.

In addition, when the matrix in FIG. 7 is cascade-connected to the matrix in FIG. 4 or 6, not only the saturation and the intensity, but also the hue can be simultaneously, or arbitrarily and independently changed.

FIG. 8 shows a matrix when the present invention is applied to video signal processing such as an NTSC system.

More specifically, an NTSC (or PAL, or SECAM) composite color video signal is separated into luminance signal Y and two types of color-difference signals (R-Y) and (B-Y) by Y/C separator 80. Separated analog signals Y, (R-Y), and (B-Y) are sampled by A/D converters 82 at a frequency, e.g., three to four times a color subcarrier frequency and converted into digital signals Y, (R-Y), and (B-Y).

Converted digital signals Y, (R-Y), and (B-Y) are input to matrix 15d having five types of parameters "1, a, k1, k2, k3." Parameter a is the above-described saturation conversion coefficient. Each of parameters k1, k2, and k3 is a coefficient representing a ratio of the magnitude of the corresponding one of R, G, and B signal components for constituting signal Y. In the NTSC system, parameters k1, k2, and k3 are approximately 0.59, 0.30, and 0.11, respectively (Y=0.59G+0.30R+0.11B). Coefficient K is a parameter of the intensity.

Digital signals Y*, (R-Y)*, and (B-Y)* whose saturation and/or intensity are controlled by matrix 15d are converted into analog signals Y*, (R-Y)*, and (B-Y)* by D/A converters 84, respectively. The converted analog signals are converted into NTSC composite color signals by NTSC decoder 86 (when an analog output is not required, converters 84 and decoder 86 can be omitted).

Matrixes 15b, 15c, and 15d in FIGS. 6, 7, and 8 are particular and have less generality as compared with matrix 15a in FIG. 4. If each of matrixes 15b, 15c, and 15d is constituted by an exclusive hardware component such as a gate array, peripheral circuits can be simplified. However, versatility of the hardware matrix itself is decreased.

On the contrary, hardware matrix 15a in FIG. 4 is a simple matrix which can be generally used. Therefore, versatility of this hardware matrix itself is excellent.

The NTSC saturation/intensity converter in FIG. 8, however, can be widely applied to a commercial digital video equipment which will be widely used in the future. Therefore, a device cost of the hardware of FIG. 8 will be largely decreased because of mass production.

The present invention can be utilized for digital control of the saturation, intensity, and/or hue of color data represented by C (cyan), M (magenta), and Y (yellow) in place of RGB.

As has been described above in detail, according to the present invention, when only a linear coupling arithmetic operation (matrix calculation) using a linear coupling processor (gate array, digital signal processor, MPU, etc.) is performed on the basis of given saturation conversion coefficient a, saturation conversion of a color image can be realized. In other words, according to the present invention, high-speed and high-performance saturation conversion of a color image can be performed wit a small-scale hardware arrangement.

While the invention has been described in connection with what is presently considered to be the most practical and preferred embodiment, it is to be understood that the invention is not limited to the disclosed embodiment but, on the contrary, is intended to cover various modifications and equivalent arrangements included within the scope of the appended claims, which scope is to be accorded the broadest interpretation so as to encompass all such modifications and equivalent arrangements.

What is claimed is:

1. A high-speed saturation converter for a color image, comprising:
    first R, G, and B image memories for storing digital color image data separated into R, G, and B components, r, g, and b;
    matrix coefficient calculating means for calculating two types of matrix coefficients $\alpha$ and $\beta$ defined by the following equation based on a predetermined saturation conversion coefficient a:

$$\alpha = 1 + 2a, \beta = 1 - a;$$

processor means for calculating R, G, and B components r*, g*, and b* of a first pixel position when saturation conversion S*=aS is performed with respect to vector S, in an RGB color space, of saturation components r, g, and b of a second pixel position of said first R, G, and B image memories that corresponds to the first pixel position, in accordance with the following matrix equation defined when an intensity before and after the conversion is constant:

$$\begin{pmatrix} r^* \\ g^* \\ b^* \end{pmatrix} = (1/3) \begin{pmatrix} \alpha & \beta & \beta \\ \beta & \alpha & \beta \\ \beta & \beta & \alpha \end{pmatrix} \begin{pmatrix} r \\ g \\ b \end{pmatrix};$$

and second R, G, and B image memories for storing the R, G, and B components r*, g*, and b* calculated by said processor means in a position of the first pixel.

2. The high-speed saturation converter for a color image according to claim 1, wherein the matrix coefficient calculating means is a gate array.

3. The high-speed saturation converter for a color image according to claim 1, wherein the matrix coefficient calculating means includes storing means for storing the matrix coefficients.

4. The high speed saturation converter for a color image according to claim 1, where the processor means is a central processing unit.

5. The high speed saturation converter for a color image according to claim 1, where the processor means includes means for storing the matrix coefficients.

6. The high speed saturation converter for a color image according to claim 1, further comprising a display connected to the second imaging memories for displaying data according to the R, G, B, components of the second image memories.

7. A converter for changing a saturation of color data representing three primary colors, comprising:
   means for providing r, g, and b data corresponding to the primary color data;
   means for generating changeable matrix parameters $\alpha$ and $\beta$ by which the saturation is defined; and
   means for converting the r, g, and b data into r*, g* and b* data using a conversion matrix such that a color saturation of the r*, g*, and b* data can be changed independently of an intensity of the r*, g* and b* data according to said matrix parameters $\alpha$ and $\beta$, said conversion matrix being defined in the following relation;

$$\begin{bmatrix} r^* \\ g^* \\ b^* \end{bmatrix} = K \begin{bmatrix} \alpha & \beta & \beta \\ \beta & \alpha & \beta \\ \beta & \beta & \alpha \end{bmatrix} \begin{bmatrix} r \\ g \\ b \end{bmatrix}$$

where K in the above relation is a proportional constant defining the intensity of the r*, g* and b* data.

8. A converter according to claim 7, wherein said generating means includes:
   means responsive to a given color saturation parameter a, for calculating $(2a+1)$ to provide said matrix parameter $\alpha$; and
   means for calculating $(1-a)$ to provide said matrix parameter $\beta$.

9. A converter according to claim 7, wherein the converting means includes means for setting the proportional constant K to substantially "⅓," so that the color saturation of the r*, g*, and b* data is changed while the intensity thereof is substantially fixed.

10. A converter for changing a hue of color data representing three primary colors, comprising:
   means for providing r, g, and b data corresponding to the color data; and
   means responsive to variable parameters K and $\theta$, for converting the r, g, and b data into r*, g*, and b* data using a conversion matrix, such that a hue of the r*, g*, and b* data can be changed independently of an intensity of the r*, g* and b* data according to said parameter $\theta$, said conversion matrix being defined in the following relation:

$$\begin{bmatrix} r^* \\ g^* \\ b^* \end{bmatrix} = K \begin{bmatrix} 2\cos\theta + 1 & -\sqrt{3}\sin\theta - \cos\theta + 1 & \sqrt{3}\sin\theta - \cos\theta + 1 \\ \sqrt{3}\sin\theta - \cos\theta + 1 & 2\cos\theta + 1 & -\sqrt{3}\sin\theta - \cos\theta + 1 \\ -\sqrt{3}\sin\theta - \cos\theta + 1 & \sqrt{3}\sin\theta - \cos\theta + 1 & 2\cos\theta + 1 \end{bmatrix} \begin{bmatrix} r \\ g \\ b \end{bmatrix}$$

where the parameters K and $\theta$ define the intensity and hue of the r*, g*, and b*, respectively.

11. A color processor for controlling a color saturation of a composite color signal including a luminance signal Y, a color-difference signal (R-Y), and a color-difference signal (B-Y), comprising:
   means for converting an analog composite color signal into digital signals Y, (R-Y), and (B-Y);
   means responsive to variable parameters K and a, for converting the digital signals Y, (R-Y), and (B-Y) into digital signals Y*, (R-Y)*, and (B-Y)* using a conversion matrix, such that a saturation of a color signal produced from the signals Y*, (R-Y)* and (B-Y)* can be changed independently of an intensity of the color signal according to said parameter a, said conversion matrix being defined in the following relation:

$$\begin{bmatrix} Y^* \\ (R-Y)^* \\ (B-Y)^* \end{bmatrix} =$$

$$K \begin{bmatrix} 1 & (1-a)(k1-k2)/3K1 & (1-a)(k1-k2)/3k1 \\ 0 & a & 0 \\ 0 & 0 & a \end{bmatrix} \begin{bmatrix} Y \\ (R-Y) \\ (B-Y) \end{bmatrix}$$

where k1, k2, and k3 are predetermined coefficients, and the parameters K and a define the intensity and saturation of the color signal, respectively; and
   means for converting the signal Y*, (R-Y)*, and (B-Y)* into a processed composite color signal.

* * * * *